July 10, 1945.  R. N. CARTER  2,380,216
LENS SYSTEM
Filed Feb. 9, 1942  2 Sheets-Sheet 1
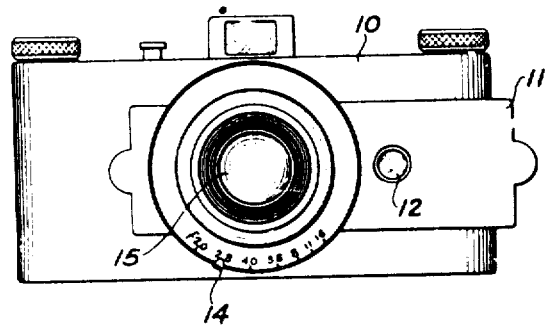
Fig. 1
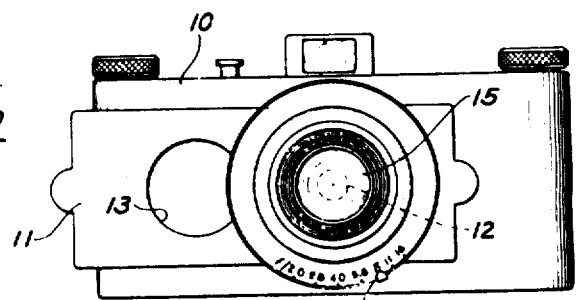
Fig. 2
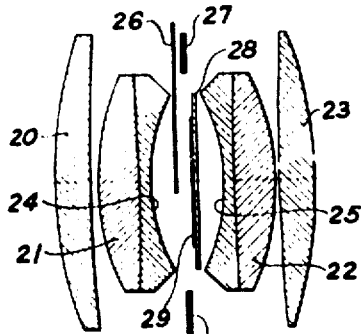
Fig. 3
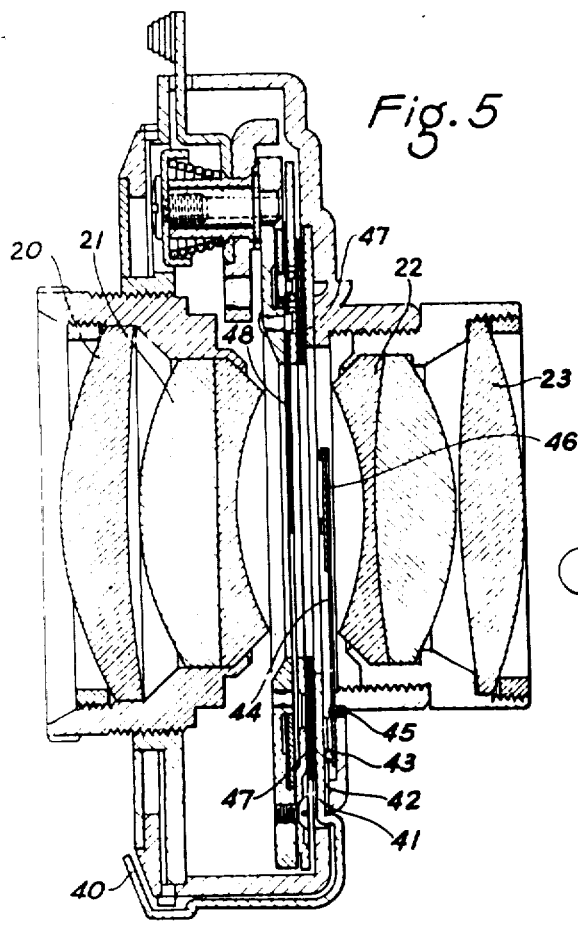
Fig. 5
Fig. 4
Rolla N. Carter
INVENTOR
BY
ATTY. & AGT.

July 10, 1945.  R. N. CARTER  2,380,216
LENS SYSTEM
Filed Feb. 9, 1942  2 Sheets-Sheet 2
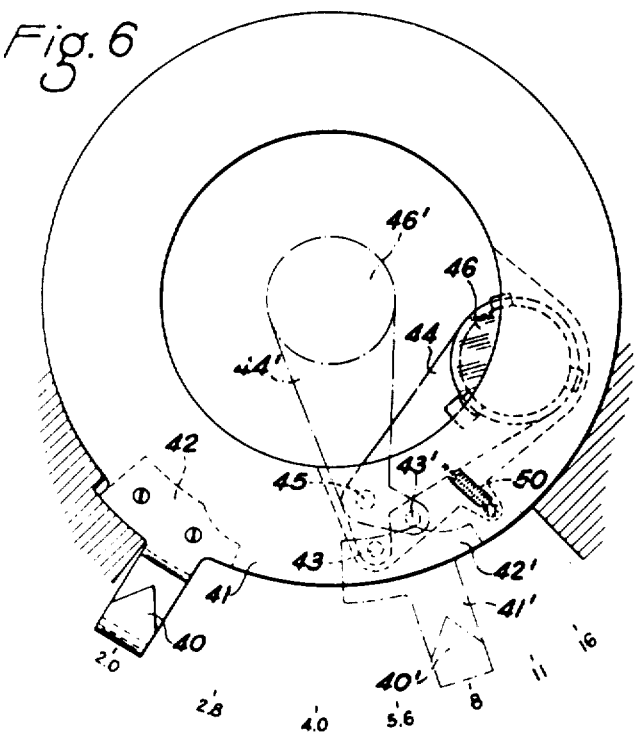
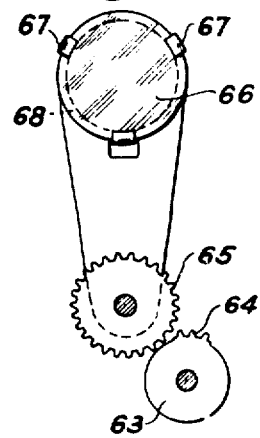
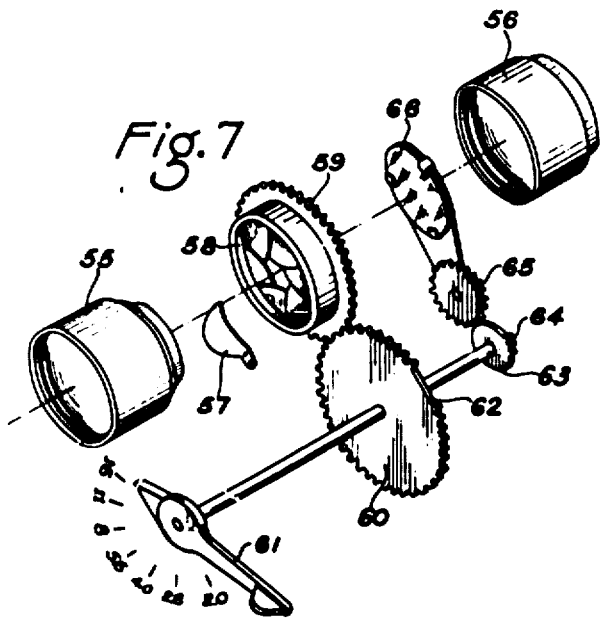
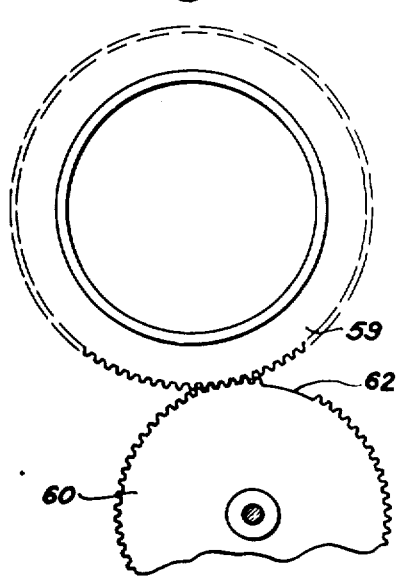
Rolla N. Carter
INVENTOR
BY
ATT'Y. & AG'T.

Patented July 10, 1945

2,380,216

UNITED STATES PATENT OFFICE 2,380,216

LENS SYSTEM

Rolla N. Carter, Rochester, N. Y., assignor to Eastman Kodak Company, Rochester, N. Y., a corporation of New Jersey Application February 9, 1942, Serial No. 429,975

7 Claims. (Cl. 95—64)

This invention relates to lens systems and has for one incidental object the reduction of depth of field at small apertures to gain artistic effects.

It relates particularly to high aperture objectives of the type having troublesome internal reflections produced by refracting surfaces on opposite sides of an air space between elements of the system. These reflections cause flare which is particularly noticeable and objectionable at low aperture settings of the lens. I believe that this is due to the diaphragm not cutting down the internal reflections as much as it cuts down the useful light.

The second and main object of the invention is to provide means for cutting down these reflections and the resulting flare at least as much as it cuts down the useful light.

To do this I use a filter, preferably one having neutral density, and mounted so as to be positionable alternatively in and out of line with the lens system. Such a filter when in line with the optical system reduces the flare and the useful light equally and also permits larger aperture openings at the lower transmission values of the system so as to give a depth of field which is relatively reduced at the low transmission settings of the system. Mounting the filter so that it is operable by the means usually employed solely for adjusting the diaphragm, permits the filter to be automatically inserted as the adjusting means is moved to smaller aperture stops, which in this case are calibrated to correspond to transmission values rather than actual aperture diameters.

It is the third object of the invention and the most important in practice to cut down the unwanted reflections many times the amount the useful light is cut down. This third object is really an extension of the second object and is accompanied by proper positioning of the filter.

According to the invention the filter is positioned, when axially aligned, in an air space of the lens system which air space is between the particular refracting surfaces cooperating to cause the troublesome internal reflections. When the filter is thus located, the useful light, i. e., the light used to form the main image, passes through the filter only once and is reduced exactly by the amount desired. On the other hand, the annoying light caused by internal reflections passes through this filter at least three times before reaching the image plane and is thus considerably reduced relative to the useful light in this plane.

Of course, it is not desirable to have the filter permanently in such an air space in the lens since the transmission of the light, at maximum aperture would be reduced and the lens would have a correspondingly reduced "speed." Therefore, according to the preferred embodiment of the invention the filter is inserted only at small apertures. Furthermore, it is preferable to have the filter inserted automatically by the diaphragm adjusting means as it is adjusted to smaller stops and to have this filter displaced to one side of the system as the aperture is adjusted to higher stops. In the most preferred form of the invention, the adjusting means which operates both the diaphragm and the filter is arranged to vary the light transmission of the objective by substantially uniform increments but to vary the aperture size non-uniformly so as to compensate for the density of the filter. For example, an f/2 lens may have its diaphragm adjusted for controlling the light transmission down to f/5.6 then as the adjusting means is moved so that the scale reads f/8, the actual aperture is left unchanged but a filter having a neutral density of .3 is moved into axial alignment of the system. This filter then remains in place as the diaphragm is reduced further always at a diameter corresponding to one full stop larger than those of the scale reading. A density of .3 reduces the transmission one-half and thus corresponds to a charge of one stop such as from f/5.6 to f/8.

Other objects and advantages of the invention will be understood from the accompanying drawings in which:

Figs. 1 and 2 are front views of a camera incorporating one embodiment of the invention;

Fig. 3 is a cross section of the lens system incorporated in the camera shown in Figs. 1 and 2;

Fig. 4 shows an alternative arrangement to replace the separate diaphragm and filter slide of Figs. 1 to 3;

Fig. 5 is the cross section of a lens system incorporating a different embodiment of the invention;

Fig. 6 is a front view of the important details of Fig. 5;

Fig. 7 is an expanded perspective of an arrangement alternative to that of Figs. 5 and 6;

Figs. 8 and 9 are front views of details of Fig. 7.

In Figs. 1 and 2 a camera 10 is provided with a lens 15 having a variable diaphragm controlled in the usual way by a rim carrying a pointer 14. According to the invention, there is also provided adjacent to the diaphragm a slide 11 having a large aperture 13 therein larger than the maximum lens diameter and a second aperture 12 with a neutral density thereover. The aperture 12 may be the same size as the reference aperture 13, but since it is preferably used only at smaller aperture settings, it may be smaller than the aperture 13 as shown.

The lens system for this camera is made up of four components 20, 21, 22 and 23 as shown in Fig. 3 which components include refractive surfaces 24 and 25 which cooperate to cause flare. That is, light coming through the lens from the front strikes the surface 25 and is reflected thereby to the surface 24 whereat it is again reflected through the rest of the lens system to cause flare. At high aperture if controlled by the diaphragm blades 27 this flare producing light is relatively so weak as not to be noticeable or objectionable. However, as the diaphragm closes down to reduce the light transmission of the system, it does not cut down the flare proportionally. This is due to the fact that most of the flare light passes through the paraxial region of the aperture. According to the invention a filter 29 having neutral density is mounted on a slide 28 so as to be positionable in alignment with the system at low apertures. Such a filter will, of course, act to reduce the flare at least linearly proportional to the reduction of useful light. For this broad purpose it may be anywhere in alignment with the system and preferably should be inserted instead of changing the aperture.

In a preferred embodiment of the invention, the filter 29 is inserted as shown in an air space in the lens system between the refracting surfaces 24 and 25 which cooperate to cause the objectionable flare. With this arrangement the objectionable light must pass through the filter at least three times, whereas the useful light passes through it only once. Thus, the flare is reduced many times compared to the reduction in useful light. As in the general case, the introduction of this filter may be a substitute for reduction in aperture. The position of the shutter blade 26 is also indicated in Fig. 3.

One convenient method of having the insertion of the filter corresponding to and replace the change in aperture is shown in Fig. 4. With such an arrangement the usual variable aperture is omitted entirely or is left at maximum opening. As the slide 30 is moved (in place of the slide 11, Figs. 1 and 2) the scale 37 indicates the light transmission of the lens against an index 38 in terms of the usual aperture stops. For example, apertures 31, 32 and 33 correspond to aperture stops f/2.0, f/2.8 and f/4.0. As the slide is moved so that the index 38 is opposite f/5.6, the actual aperture 34 is no different in size from the aperture 33. However, a neutral density filter 36 having a density of .3 covers the aperture 34 and all smaller apertures such as 35. Thus, the light transmission of the objective is changed in substantially uniform increments, dividing the transmission by two in each case, but the changes in aperture size include a break since there is no change between aperture 33 and 34.

Another method of coupling the diaphragm change to the insertion of the filter is shown in Figs. 5 and 6 wherein the diaphragm blades 47 were carried and operated by a member 41 which in turn carries an index 40 to be read against an aperture scale. This member 41 also carries a cam 42 which, as the diaphragm is adjusted from f/5.6 to f/8, engages a cam rider 43 carried on a filter mount 44 pivoted on the point 45. As the member 41 is moved to the position 41', shown in Fig. 6, the filter mount 44 is moved to the position 44' against the action of a spring 50 to move a filter 46 from one side of the optical system into axial alignment therewith in the position 46'. The position of the shutter blade 48 is also indicated in Fig. 5. In the preferred form of this embodiment, the movement of the diaphragm setting member 41 from f/5.6 to f/8 does not change the aperture setting, but merely inserts the filter 46 into the system. Similarly, movement of the member 41 from f/8 to f/5.6 removes the filter.

One method of coupling the filter and diaphragm controls so that they operate alternatively is shown in Figs. 7, 8, and 9. In Fig. 7 the optical system is expanded axially for clarity, the front and rear components 55 and 56 being considerably spaced. A shutter 57 is mounted in front of a diaphragm 58 which is controlled by a gear 59. The position of a filter 66 is also controlled by a gear 65. The diaphragm setting means 61 operates two partly mutilated gears 60 and 63 which engage the gears 59 and 65 respectively. When the mutilated portion 62 of the gear 60 is adjacent to the gear 59, the teeth 64 of the gear 63 engage the gear 65. By way of example, the operation starting at maximum aperture will be described. As the aperture setting means 61 is moved to smaller apertures, the diaphragm 58 closes down until the mutilated portion 62 comes adjacent to the gear 59 at which time further movement of the member 61 causes no change in aperture. However, at this same time the teeth 64 engage the gear 65 and move the filter 66 from one side of the system into axial alignment with the system, suitable stops, not shown, being provided to insure accurate alignment of the filter.

The filter 66 is carried by lugs 67 on a very narrow rim 68 so that there is minimum interference with the light transmission as the filter is swung into place. The purpose of this is to prevent underexposure if the operator should accidentally happen to set the diaphragm at some point between f/5.6 and f/8. In fact, since the actual aperture would still correspond to f/5.6 and the filter 66 would cover a portion of this aperture, the actual exposure factor would be somewhere between f/5.6 and f/8.

Having thus described the preferred embodiment of my invention, I wish to point out that it is not limited to the specific arrangement but is of the scope of the appended claims.

What I claim and desire to secure by Letters Patent of the United States is:

1. An objective comprising a lens mount, a highly corrected lens consisting of a plurality of components carried in the mount and having troublesome internal reflections produced cooperatively by refracting surfaces on opposite sides of an airspace between components, and a variable aperture diaphragm for the lens in said airspace, the reflections being relatively more troublesome at small apertures than at large characterized by a zero power light filter of density less than .5 carried by the mount axially aligned in said airspace uniformly extending over all of the light beam transmitted by said diaphragm at small apertures only whereby, at said small apertures, the reflection producing light is reduced by at least three passages through the filter.

2. An objective according to claim 1 including means for automatically moving the filter to one side of the light beam at wide aperture settings of the diaphragm.

3. An objective comprising a lens mount, a highly corrected lens consisting of a plurality of components carried in the mount and having troublesome internal reflections produced cooperatively by refracting surfaces on opposite sides of an airspace between components, an adjustable diaphragm for the lens between the components, and means for adjusting the diaphragm, characterized by a zero power light filter carried by the mount and movable, automatically by the diaphragm adjusting means, to one side of the system at large apertures and into said airspace to extend uniformly over all of the aperture at small aperture settings of the diaphragm.

4. An objective comprising a lens mount, a highly corrected lens consisting of a plurality of components carried in the mount and having troublesome internal reflections produced cooperatively by refracting surfaces on opposite sides of an airspace between components, and an adjustable diaphragm for the lens between said components, characterized by a light filter carried movably on the mount, and means including a scale marked in aperture stops for adjusting the diaphragm in accordance with the stops except that between two certain successive stops the aperture diameter remains at substantially constant value and for moving the filter into said airspace while adjusting from the larger to the smaller of said certain stops and to one side of the system while adjusting in the opposite direction between said certain stops.

5. Lens diaphragm means for use in a lens system having troublesome internal reflections produced cooperatively by refracting surfaces on opposite sides of an airspace between components of the system, said diaphragming means comprising a scale marked successively in successive aperture stops, an adjustable diaphragm in said airspace, a filter alternatively positionable in and out of said airspace and means carrying an index reading on said scale, for adjusting the light transmission of the lens to correspond to the reading of the index said adjusting means operating solely on the diaphragm changing its aperture except between two certain successive stops and operating solely on the filters between said certain stops positioning the filter in said airspace at the smaller stop setting and out of said airspace at the larger stop setting.

6. A lens system comprising as its light transmission control device means for varying the aperture giving a series of successively different diameters, two and only two successive values of the diameter being equal, a light filter alternatively positionable in and out of alignment with the system, uniformly extending over all of the light beam transmitted by said aperture when in alignment and means including a scale calibrated in aperture stops for successively varying the aperture through its larger values down to said certain value, then for moving the meter into alignment and then for varying the aperture successively through the smaller values and vice versa, the scale readings being calibrated in accordance with the transmission as controlled both by the aperture and by the filter.

7. An objective comprising a lens mount, a highly corrected lens consisting of a plurality of components carried in the mount and having troublesome internal reflections produced cooperatively by refracting surfaces on opposite sides of an airspace between components, and a variable aperture diaphragm for the lens in said airspace, the reflections being relatively more troublesome at small apertures than at large characterized by a filter carried by the mount axially aligned in said airspace, said filter being positioned so that at aperture settings less than a certain small setting, it absorbs the light transmitted by the diaphragm by an amount equivalent to a density less than .5 and at maximum aperture setting, it has no effective absorption.

ROLLA N. CARTER.